United States Patent [19]

Maerte

[11] Patent Number: 4,830,284
[45] Date of Patent: May 16, 1989

[54] ATOMIZING OR DOSING PUMP

[75] Inventor: Leo Maerte, Sipplingen, Fed. Rep. of Germany

[73] Assignee: Ing. Erich Pfeiffer GmbH & Co. KG, Radolfzell, Fed. Rep. of Germany

[21] Appl. No.: 592,076

[22] Filed: Mar. 22, 1984

[30] Foreign Application Priority Data

Apr. 28, 1983 [DE] Fed. Rep. of Germany ....... 3315334

[51] Int. Cl.⁴ ................. B05B 9/043; G01F 11/00
[52] U.S. Cl. .................... 239/333; 239/487; 222/321; 222/383; 251/337; 417/550
[58] Field of Search ............... 417/550; 222/321, 383; 239/487, 333, 329, 331, 453, 574; 251/337

[56] References Cited

U.S. PATENT DOCUMENTS

| | | | |
|---|---|---|---|
| 2,717,178 | 9/1955 | Cornelius | 239/333 |
| 2,884,164 | 4/1959 | Kleid | 222/207 |
| 3,166,250 | 1/1965 | Kappell | 239/487 |
| 3,940,070 | 2/1976 | Boris | 239/333 |
| 4,051,983 | 10/1977 | Anderson | 239/333 X |
| 4,155,489 | 5/1979 | Steiman | 222/321 |
| 4,174,069 | 11/1979 | Grogan | 239/333 |
| 4,174,790 | 11/1979 | Nozawa et al. | 222/321 |
| 4,220,285 | 9/1980 | Gualdi | 239/333 X |
| 4,365,729 | 12/1982 | Saito et al. | 222/321 |

FOREIGN PATENT DOCUMENTS

| | | |
|---|---|---|
| 1299530 | 7/1969 | Fed. Rep. of Germany . |
| 2504885 | 1/1976 | Fed. Rep. of Germany . |
| 2162514 | 3/1976 | Fed. Rep. of Germany . |
| 1328326 | 8/1973 | United Kingdom . |
| 1366774 | 9/1974 | United Kingdom . |
| 2051969 | 1/1981 | United Kingdom . |

Primary Examiner—Andres Kashnikow
Assistant Examiner—Mary Beth O. Jones
Attorney, Agent, or Firm—Steele, Gould & Fried

[57] ABSTRACT

A dosing or atomizing pump for liquid, creamy or pasty media has, in addition to its outlet valve provided on the pump chamber an additional valve provided in the pump operating pushbutton and closes the discharge opening directly at its mouth. By means of the hydraulic pressure, the additional valve body is operated by means of a differential piston. In a variant, the valve body can be a functional part of an atomizer nozzle. The additional valve prevents drying or other negative influencing of the medium in the discharge passage.

12 Claims, 2 Drawing Sheets

ATOMIZING OR DOSING PUMP

BACKGROUND OF THE INVENTION

The invention relates to an atomizing or dosing pump with an outlet valve, an outlet passage positioned downstream thereof and which terminates in a mouthpiece in the form of an opening or an atomizing nozzle, and an additional closure member arranged in the outlet passage.

German Pat. No. 21 62 514 discloses a hand pump more particularly intended for dispensing creamy or pasty media and which has a single-acting thrust piston pump like the piston pumps used for perfume atomizers. The outlet valve is provided at the outlet side end of the hollow piston rod, with which is associated a device for sucking back into an intermediate reservoir medium present in the outlet passage following on to the valve after the end of the delivery stroke, in order to prevent hardening taking place at the outlet nozzle. Between said reservoir and the outlet passage is provided a closure member in the form of a slotted disk, which can open to either side and brings about a partial closure as a result of its natural elasticity.

In addition, British Pat. No. 1 366 774 discloses an atomizing pump, whose outlet valve has a double closing or sealing function in that on the one hand under internal pressure it rises axially from a valve disk and on the other hand by radial expansion of a hose-like portion of the same piston section frees a cross hole in the piston rod. However, as the second valve is a long way from the actual discharge opening or the atomizing nozzle, influencing of the medium in the flow direction behind the outlet nozzle cannot be excluded.

SUMMARY OF THE INVENTION

The problem of the invention is to provide an atomizing or dosing pump, which ensures that the medium present in the area between the pump cylinder and the discharge opening does not dry or is not damaged in other ways by ambient infuences.

According to the invention this problem is solved by the characterizing part of claim 1.

The valve is preferably operable by the pressure of the delivered medium, and is preferably directly located at the mouthpiece. It therefore effectively ensures that the medium present in the outlet passage is not exposed to air and is not prejudiced or made unusable there through drying out, oxygen influence or contamination. The arrangement of the valve, in addition to the outlet valve, has the advantage that the latter between the mouthpiece and the pump chamber does not actually belong to the pressure area of the pump chamber, so that the operating cap normally containing the discharge opening or atomizer nozzle can easily be replaced by pulling off. During operation there is no detachment risk, because the connection is compressed by the manual operating pressure on the operating button.

The valve can have a rod-like valve body incorporating from the inside with the mouthpiece opening and which is located in said opening in the manner of a nozzle needle and can optionally be constructed in such a way that it can strike against this opening to free it from any material drying on it.

Advantageously the valve is operable by a piston arranged on the valve body. In this case, the additional valve is directly operated by the hydraulic pressure, the piston being in particular a double piston with different piston surfaces on which action takes place from either side. Thus, the additional valve body can be arranged in the actual outlet and when the opening pressure builds up, it moves away from the mouthpiece opening.

According to an advantageous embodiment of the invention, the valve body can be formed by a spring comprising elastic, outwardly spreadable webs and the ends of said spring preferably engage on a conical surface. The valve rod, piston and webs are preferably made in one piece from plastic. Thus, this very simple component hardly increases the cost of the complete valve, but is still sufficiently reliable.

The end of the valve preferably forms a component of an atomizer nozzle, which has a cross-section variable by the valve body. The three passages of the atomizer nozzle can also be provided in the form of three grooves on the pump, which are covered by the valve body. On the one hand this makes it possible to use the additional valve as a component of the actual atomizer nozzle, thereby inter alia saving on other components, and on the other hand it is possible to vary the cross-section of the atomizer nozzle as a function of the additional valve opening, i.e. the throughput quantity, so as to better ensure a uniform atomization even in the case of variable discharge quantities. The valve body also acts as a movable part within the atomizer nozzle for freeing the latter from undesired residues. Through the construction of the nozzle from a nozzle cap and a needle valve, there is no need for a separate nozzle which has to be pressed in from the outside and whose installation hitherto had to be carried out with great care, because the automatic detachment of a nozzle under the internal pressure, particularly in the case of pharmaceutical products, could lead to catastrophic overdosage or to injury of the patient.

The invention leads to numerous advantages. Up to the opening of the nozzle, a certain internal pressure builds up in the outlet passage until the additional valve opens. This means that the atomization takes place from the outset in a complete and drip-free manner, which also applies for the closing of the valve. Particularly if it is operated independently of the mechanical movement of the pump chamber outlet valve, the additional valve can be fitted in any random position, e.g. centrally in the axial direction of the pump in the case of a central discharge opening (e.g. in the case of a nose spray) or at right angles to the pump axis in the case of a lateral discharge opening. It is also independent of the discharge opening design and it is possible to provide for the same pump several different operating heads having in each case their own additional valve with the advantageous nozzle needle, which can be retracted under the pressure of the medium. The invention can be used with media of different types, namely both for light liquid media, which are e.g. atomized and which have to be protected from drying out or the evaporation of active constituents (perfume), and for pasty media, which must be protected from drying out, oxidation or contamination.

BRIEF DESCRIPTION OF THE DRAWINGS

The invention is described in greater detail hereinafter relative to non-limitative embodiments and with reference to the attached drawings, wherein.

DETAILED DESCRIPTION OF THE PREFERRED EMBODIMENTS

Figure 1:
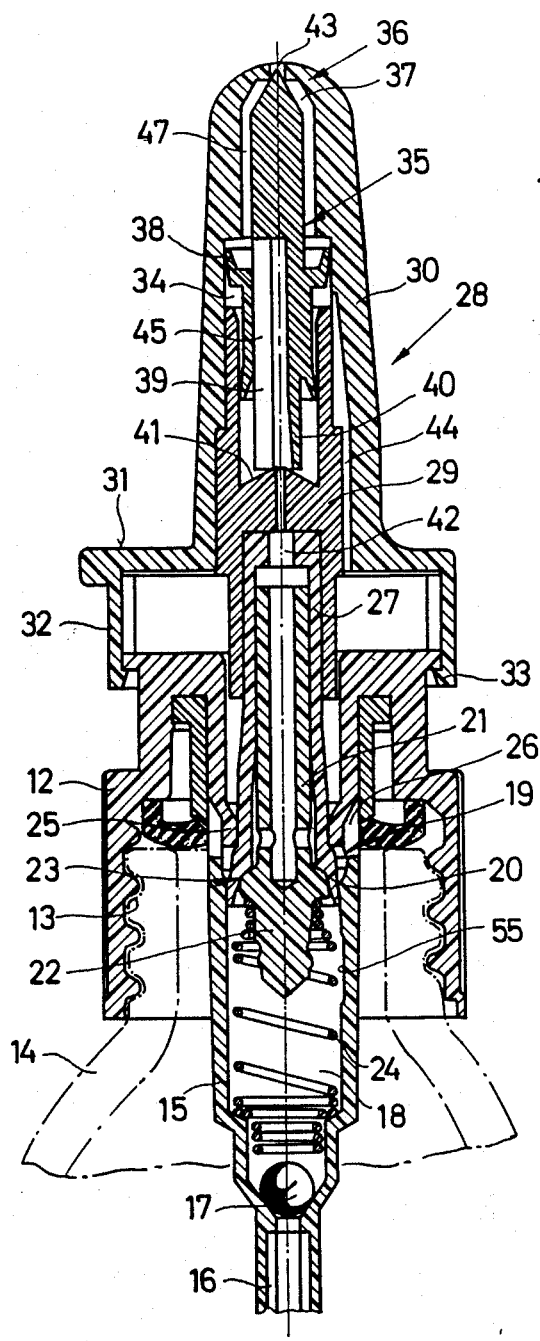
FIG. 1 is a section view along the axis of a dosing pump.

The dosing pump 11 shown in FIG. 1 has a pump body 12, which can be screwed by means of a thread 13 on to a container 14, indicated by dot-dash lines, which contains the medium to be dispensed. A pump cylinder 15 is snapped into pump body 12. Pump cylinder 15 projects into the container and a suction tube 16 is mounted on its lower end. Suction tube 16 extends down to the bottom of the container and sucks up the medium through an inlet valve 17 into pump chamber 18.

A piston 19 is located into the pump chamber and has an elastic sleeve 20, which, in conjunction with a valve body 22 arranged on a piston rod 21, simultaneously forms the outlet valve 23 for the pump chamber. This valve is described in detail in German Pat. No. 13 02 372. It opens under the internal liquid pressure in the pump chamber, through axial displacement of the sleeve part, the sleeve neck being axially compressed, thereby supplying the spring tension for closing the valve. The piston is forced upwards by a spring 24, which has the function of a return spring and also applies the conical top of the piston sleeve 20 against the sealing shoulder 25, which closes the air compensating openings 26 when piston 19 is forced into its upper, unoperated position by spring 24.

The piston component having on its lower portion the elastic piston sleeve 20 surrounds the hollow piston rod 21 over and beyond its end and in said shank portion 27 is fixed in an insert part 29 belonging to the operating pushbutton 8. The latter comprises insert part 29 and a pushbutton part 30 surrounding the latter and which is extended axially in finger-like manner. It is provided at its lower end with a shoulder 31 for operating with the fingers and a cylindrical edge 32 connected thereto, which engages over the pump body and is optionally fixed thereto by latches 33.

Insert part 29 and the hollow pushbutton part 30 form an operating cylinder 34 with two diameter steps, in which is arranged a valve body 35 on an additional valve 36. Operating cylinder 34 comprises the assembly of parts 29 and 30, the larger diameter cylinder portion being located in the pushbutton part and the smaller diameter portion in the insert part, namely towards the pump body. The movable valve body 35 comprises a nozzle needle-like rod with a conical valve seat 37 at its upper end and a shaped-on differential piston, whose elastic sleeves 38, 39 run in the individual stages of operating cylinder 34, and permit a limited axial mobility of the valve body. The end of the valve body remote from the valve seat is subdivided by several slots into three lug-like spring webs 40, which are placed on a conical surface 41, which downwardly terminates the operating cylinder 34 and in whose centre ends a connecting opening to the hollow piston rod, which belongs to the medium delivery passage 42.

The spring webs 40 can laterally slide away on conical surface 41, and, due to the elastic properties of the plastic, from which the valve body is made, act as pressing springs and feelingly pres the valve seat 37 on to the inner surface of a central outlet opening 43 at the upper end of operating pushbutton 28. The part of the operating cylinder 34 between the two piston sleeves 38, 39 is connected to the atmosphere by means of a compensating passage 44. The slots in the valve body and which subdivide the spring webs extend over the upper piston sleeve 38 and consequently form part of the medium delivery passage. The aforementioned dosing pump operates in the following way. When the operating pushbutton 28 is forced downwards by pressing on shoulder surface 31, the piston sleeve 20 in pump chamber 18 moves downwards and compresses the medium contained therein. Due to the hydraulic pressure exerted on the piston sleeve, the shank-like portion thereto is move upwards under axial compression and opens the pump discharge valve 23, so that the medium flows past the annular valve seat, through the lateral bores in piston rod 21 and the medium delivery passage 42 into the operating cylinder 34, and produces an internal pressure there, because the outlet opening 43 is closed by valve body 35. Due to the differential pressures on the differently dimensioned piston steps 38, 39, valve body 35 in operating cylinder 34 is moved downwards under the tension of spring webs 40 and opens additional valve 36, so that the medium can pass out of the discharge opening 43. Thus, the latter is only opened when the medium is under a pressure determined by the piston differential surfaces and the spring tension of the spring webs 40, and is closed immediately after this pressure drops. The pressure decrease occurs relatively rapidly because then the piston sleeve 20 with its lower sealing end passes over a recess 55 in the pump cylinder wall, so that the sealing sleeve and the pressurized medium in the pump chamber 18 are detoured and the pressure collapses suddenly. Overflowing medium can flow back into the container through the air compensating openings 26.

This recess 55 also assists with the initial suction with the pump chamber still filled with air. The compressed air can also flow back into the container via recess 55, so that during the next upward stroke a vacuum is produced and sucks medium into the pump chamber via inlet valve 17 and suction tube 16.

It can be seen that additional valve 36 closes the outlet passage 47 which, in its final portion surrounds the rod-like section of valve body 34, directly at the discharge opening 43, the tip of the valve body projecting into the latter always keeping it open. As the additional valve 36 only opens in one direction, namely in the discharge direction, even in the case of an external overpressure or a vacuum in the container, nor air can enter the discharge passage and no possibly already contaminated medium can be sucked back again.

Figure 2A:
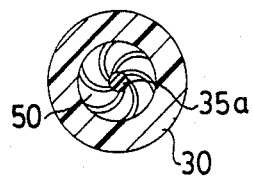
FIG. 2a is a section taken along line II—II of FIG. 2.
Figure 2:
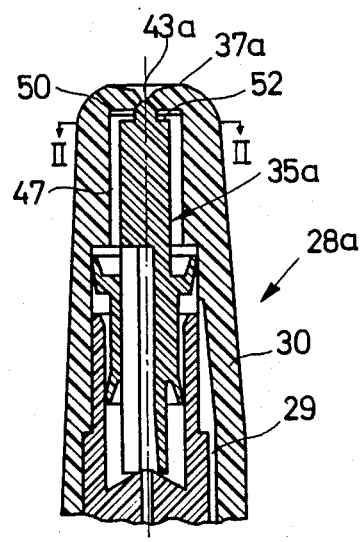
FIG. 2 is a section view of a detail of an embodiment constructed as an atomizing pump.

The variant shown in FIG. 2 is in all its details identical to the construction of FIG. 1, with the exception of those described hereinafter. With respect to this and to the following variants, reference should be made to the preceding description in connection with identical parts which carry the same reference numerals. Similar or functionally identical parts carry the same reference numerals with an index.

In place of the discharge opening in FIG. 1, in the case of FIG. 2 an atomizer nozzle is provided at the end of the operating pushbutton 28a. On the upper end face of the bore forming the compensating passage 47, it contains three grooves 50, i.e. helical grooves between corresponding ribs, which impart an angular momentum to the medium when it is flowing through. Thus, in outlet nozzle 43a, the medium has a considerable angular momentum, which conically breaks up and atomizes the liquid jet when it passes out of the discharge nozzle. The latter is closed by a nozzle needle 37a at the end of valve body 35a. Following on to this nozzle needle, the valve body has a step 52, which partly covers the helical grooves 50 and partly closes them in the downwards direction. It is also possible to shape on to nozzle needle 37a a needle extending into the upper part of atomizer nozzle 43a and which always strikes the nozzle free in the case of liquids which harden or dry very easily.

In this construction, the main part of the atomizer nozzle, namely the helical grooves, and the lower part of the nozzle opening are always closed, the latter always being kept free by the mechanical movement of the additional valve body 35a at the time of opening. Thus, no liquid can dry in this area. In addition, the nozzle cross-section changes on opening, so that it can automatically adapt to the particular hydraulic pressure. In the case of the represented construction, the additional valve body and its springs are designed in such a way that it performs its complete valve stroke in a relatively sudden manner and completely frees the nozzle. However, as a function of the hydraulic pressure, it would also be possible to move the valve body backwards by a varying amount and consequently the nozzle needle could be made e.g. conical, so as to continuously adapt the liquid passage to the hydraulic pressure and consequently the amount of liquid discharged.

Another advantage is that the atomizer nozzle, i.e. the helical grooves, and the discharge opening are directly shaped on to the operating pushbutton, so that there is no need to use a separate nozzle body. The atomizer nozzle can be a larger diameter, because the cross-section is reduced through the nozzle needle, which facilitates manufacture.

Figure 3:
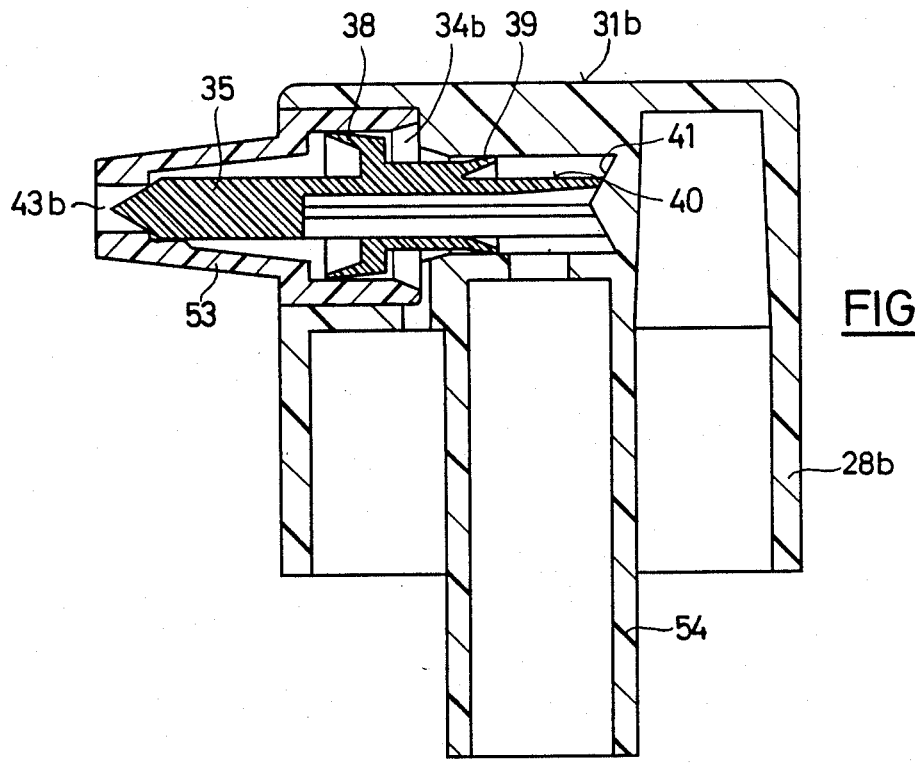
FIGS. 3 and 4 are detailed sections through variants of and the operating button of a dosing pump.

Whereas in the case of the constructions according to FIGS. 1 and 2, the discharge opening 43 or the nozzle 43a is positioned axially and arranged at the end of a finger-like projection of the operating pushbutton, in order e.g. to serve as a nose spray or the like, in the case of FIG. 3 the discharge opening 43b is provided on a lateral projection 53 of operating pushbutton 28b. The pump on which operating pushbutton 28b is mounted can correspond to that of FIG. 1.

The operating pushbutton 28b is shaped like an inverted cylindrical pot with the lateral outlet connection 53 and an upper pressure surface 31b. A cylindrical connection 54 is shaped on to the inside, and is pressed on to the piston rod of the not shown, connected pump. The connection and consequently the medium delivery passage is connected to a step-like operating cylinder 34 provided in the operating pushbutton and which has the shape and function shown in FIG. 1, except that it is arranged in a horizontally axial manner and its smaller diameter portion is located in the pushbutton, whilst its larger diameter portion is formed in the connection 53 pressed into the same. The valve body 35 and its support surface 41 are identical to those of FIG. 1, although here there is a larger outlet opening 43b for a pasty medium. In addition, the function corresponds to that explained hereinbefore.

Figure 4:
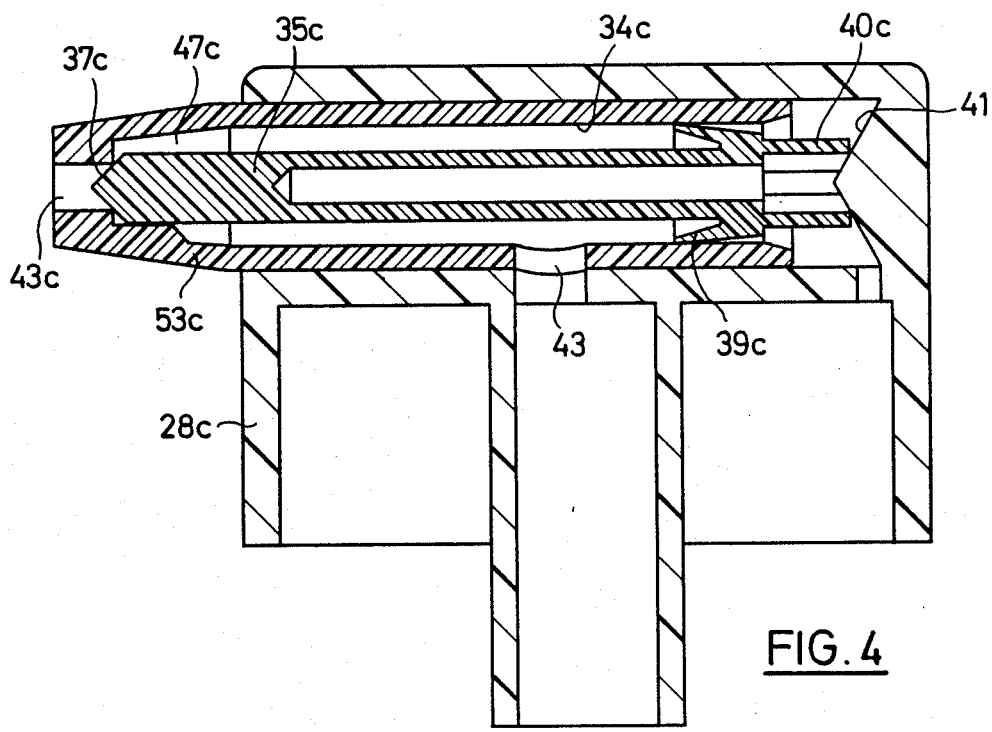

The embodiment of FIG. 4 also has a horizontally directed, relatively large discharge opening 43c, which is closed by the valve seat 37c of a horizontally arranged valve body 35c. The operating cylinder 34c for the valve body 35c is provided on a connection 53c, which is inserted in an opening in operating pushbutton 28c. In this case, the connection to the medium delivery passage 42 from the pump is between the discharge opening 43c and a piston sleeve 39c of valve body 35c. The latter has an elongated rod shape and is made in one piece from plastic with the sleeve and the spring webs 40c, in the same way as all the previously described valve bodies. The spring webs 40c are once again located on a conical surface 41 in the operating pushbutton. The piston sleeve 39c defines an annular pressure space in the operating cylinder, so that when the medium pressure builds up in operating cylinder 34c, the valve body is displaced to the right and the valve seat 37c frees the discharge opening 43c. The left-hand or front portion of valve body 35c is guided in a corresponding bore connected to discharge opening 43c and compensating passage 47c is formed by grooves in the wall of said opening.

In all the embodiments, the operating pushbutton is normally pressed on to the piston rod, but can be removed therefrom. Thus, several operating pushbutton types can be provided from the same pump. The connection between the operating pushbutton and the pump chamber is only under pressure during the actual operation and a detachment of the pushbutton does not impair the seal of the pump and the container.

What is claimed is:

1. A pump construction for dispensing a fluid in an outlet direction, comprising:

a pump with a pump pressure chamber, a fluid inlet leading thereto and a fluid outlet therefrom, the inlet having an inlet valve, said inlet valve being a valve opening only for fluid suction into said pump pressure chamber, the outlet forming an outlet passage extending between the pump pressure chamber and a final fluid outlet opening of the pump construction for dispensing the fluid, said outlet having a first fluid outlet valve for the passage of the fluid from the pressure chamber to a part of the outlet passage being positioned downstream of the first outlet valve, and a second fluid outlet valve having a closure member (13) positioned downstream of the first outlet valve in the outlet passage, wherein the first fluid outlet valve (23) is a valve only opening under fluid pressure in the pump pressure chamber (18) for fluid passage in the fluid outlet direction and wherein the second fluid outlet valve is a valve only opening under fluid pressure for fluid passage in the fluid outlet direction and closing against fluid passage in a direction opposite to the outlet direction, the closure member of the second fluid outlet valve constituting the final fluid outlet opening.

2. A pump construction according to claim 1, wherein the pump comprises a pump cylinder and a piston movable therein, said piston bearing a piston sleeve and the first fluid outlet valve.

3. A pump construction according to claim 1, wherein the second fluid outlet valve is a piston operated valve, pressure on a valve piston thereof being exerted by fluid pressure in a cylinder formed in the outlet passage between the first and second fluid outlet valves.

4. A pump construction according to claim 3, wherein the final fluid outlet opening is provided on a replaceable unit adapted for manual operation of the pump, the second fluid outlet valve and the valve piston with the cylinder being a part of said replaceable unit.

5. A pump construction according to claim 1, wherein the closure member of the second fluid outlet valve includes structure causing the inside of a nozzle forming the final fluid outlet opening to engage against a valve seat of said closure member.

6. A pump construction according to claim 3, wherein the valve piston is a double sided piston with different sized piston sleeves on opposite sides of a rod-like valve body urged by fluid pressure in the outlet passage between the first and second fluid outlet valves.

7. A pump construction according to claim 5, wherein the closure member of the second fluid outlet valve forms part of the nozzle, the nozzle being an atomizing nozzle.

8. A pump construction according to claim 5, wherein the nozzle has a variable cross-section due to movement of the closure member.

9. A pump construction according to claim 1, wherein in an end face of the fluid outlet passage provided with the final fluid outlet opening are helical grooves partly covered by a shoulder of the closure member.

10. A pump construction for dispensing a fluid in an outlet direction, comprising:
a pump with a pump pressure chamber, a fluid inlet leading thereto and a fluid outlet therefrom, the outlet forming an outlet passage extending between the pump pressure chamber and a final fluid outlet opening of the pump construction for dispensing the fluid, said outlet having a first fluid outlet valve for the passage of the fluid from the pressure chamber to a part of the outlet passage being positioned downstream of the first outlet valve, and a second fluid outlet valve having a closure member positioned downstream of the first outlet valve in the outlet passage, wherein the second fluid outlet valve is a valve only opening under pressure in the fluid outlet direction and closing against fluid passage in a direction opposite to the outlet direction, the closure member of the second fluid outlet valve constituting the final fluid outlet opening and, wherein a rear end of the closure member of the second fluid outlet valve forms a closing spring for the closure member, the closing, spring comprising elastic outwardly spreadable spring fingers.

11. A pump construction according to claim 10, wherein the closure member of the second fluid outlet valve has a closing surface of one end the second fluid outlet valve being formed in one piece of plastic material.

12. A pump construction for dispensing a fluid in an outlet direction, comprising:
a pump with a pump pressure chamber, a fluid inlet leading thereto and a fluid outlet therefrom, the outlet forming an outlet passage extending between the pump pressure chamber and a final fluid outlet having a first fluid outlet valve for the passage of the fluid from the pressure chamber to a part of the outlet passage being positioned downstream of the first outlet valve, and a second fluid outlet valve having a closure member positioned downstream of the first outlet valve in the outlet passage, wherein the second fluid outlet valve is a valve only opening under pressure in the fluid outlet direction and closing against fluid passage in a direction opposite to the outlet direction, the closure member on the second fluid outlet valve constituting the final fluid outlet opening wherein a rear end of the closure member of the second fluid outlet valve forms a closing spring for the closure member, the closing spring comprising elastic outwardly spreadable spring fingers, and,
the ends of the spring fingers slideably engage a conical surface inside the outlet passage.

* * * * *